Patented June 15, 1926.                                       1,588,476

UNITED STATES PATENT OFFICE.

CHARLES J. KINZIE, OF NIAGARA FALLS, NEW YORK, ASSIGNOR TO THE TITANIUM ALLOY MANUFACTURING COMPANY, OF NEW YORK, N. Y., A CORPORATION OF MAINE.

ZIRCONIUM-OXIDE COMPOUND AND METHOD OF MAKING SAME.

No Drawing.        Application filed May 5, 1925.  Serial No. 28,239.

My invention relates to the use of zirconium oxides or zirconia, as a pigment or opaquing substance in vitreous enamels and in other glass products, such zirconium compounds having now attained a recognized value in the arts. Of late years the price of the commonly used tin oxide opaquing agent has been often so high as to prohibit its use; hence the present developments and improvements in the adaptation of enameling and glazing processes to permit the use of zirconium compounds in place of tin oxide.

The objects of my invention comprise, among other things, provision of novel, economical and simplified methods whereby crude zirconium oxide or partially purified preparations thereof may be subjected to further treatment to improve the color of the final zirconium compound product by removing or destroying the dark particles and other impurities and also overcoming the cream or light yellow tones attributable to iron or its compounds so that such final product composed perponderatingly of zirconium oxide would have sufficient whiteness and opacity to be entirely suitable for production of white enamels in all cases, and also possess maximum opaquing strength, purity and density when used in wet process enamels.

In U. S. Letters Patent No. 1,351,091, granted to Louis E. Barton August 31, 1920, a process is set forth by which zircon (ZrSiO$_4$) is freed from its silica with the zirconium converted into zirconium cyanonitride. When this cyanonitride is heated in air to a sufficient temperature it oxidizes and gives up its nitrogen and most of its carbon, yielding a product in which the zirconium oxide is much less highly colored than the fused zirconia and furthermore possesses great pigmenting value if finely milled. However due to reactions incidental to the formation of such zirconium cyanonitride, certain electric furnace products are formed which are dark in color and, if not destroyed or removed, would cause the enamel to be gray in tone; besides the enamel surface would also be likely to be blistered from the reaction with resulting evolution of gases between these dark particles and the enamel composition even during the shortest firing period ordinarily used in enameling. Such comparatively pure but crude zirconium oxide, or zirconia, though of reasonable chemical purity, is therefore largely unsuitable unless subjected to some treatment to eliminate the objectionable dark particles and other impurities contained therein.

I have discovered that by treating this so-called crude zirconia with alkali fluoride compounds, such as sodium fluoride, in small amounts with temperatures sufficiently high and protracted would result in the substantial destruction of the dark particles and other impurities and also effect the highly desirable overcoming of the cream or yellow color of the final product while such undesired compounds would also be of such a nature as to be volatilized either in whole or in part under the protracted heating referred to.

In working out my discoveries I found that a particularly advantageous method involved the use of small amounts of sodium silico fluoride, or sodium fluosilicate (Na$_2$SiF$_6$), in varying proportions to be mixed with the crude zirconia, for example, from 4 to 15 parts by weight of sodium silico fluoride to 100 parts by weight of crude zirconia, with the preferred proportion of 8.80 parts of sodium silico fluoride to 100 parts by weight of crude zirconia. This mixture may be wet milled together, or the crude zirconia separately milled and the sodium silico fluoride thereafter intimately mixed with the comminuted zirconia. After the wet mixture is dried it is heated to from 1000 to 1100° C. and then maintained at such high temperature for about three hours. The dark particles present in the crude zirconia are destroyed or removed before the temperature reaches 1000° C. with the color of the product passing through various shades from gray as the temperature rises to the upper limit. I have found that a remarkably improved zirconium oxide product as to desired whiteness and opaquing qualities results; such product when finely milled being white or only faintly tinged with light cream. Furthermore as a result of the high temperature for a relatively protracted period, I found that part of the fluorine in the mass had been driven out carrying with it, as I believe, sufficient silicon to form silicon tetrafluoride, and in addition the temperatures in effecting the desired reactions were probably sufficiently high and prolonged to cause the sodium (probably combined with fluorine) to volatilize at least in part so that my final zirconium compound product contained only a small proportion of the reactive agent originally introduced in the mixture.

The small amounts of sodium fluoride or other soluble material in the final product are practically of no importance in industrial arts. However, such amounts of sodium and fluorine as remain in the charge may also be removed. For example, such product is first treated after wet milling with a small amount of sulphuric acid and the charge brought to a temperature of about 900° C. About 5 parts by weight of actual sulphuric acid ($H_2SO_4$) to 100 parts of the zirconium product would be sufficient. The sulphuric acid would thereby decompose any sodium fluoride present or any other sodium compound and liberate and volatize the fluorine; in so volatizing the fluorine would probably carry off sufficient silica ($SiO_2$) to form silicon tetrafluoride ($SiF_4$). The sodium would under such temperature combine with the sulphuric acid to form sodium sulphate ($Na_2SO_4$) which could thereafter be extracted by leaching with water. The original particles of zirconia should be altered by this acid treatment to the least possible extent.

Among the practical advantages of using sodium silico fluoride in small amounts as a reactive agent I will mention the following:—

(1). Such material is comparatively cheap and is readily available as a by-product in the phosphate fertilizer industry.

(2). Such material employed as I have hereinbefore set forth not only destroys or eliminates the objectionable dark particles which calcination of zirconia in air fails to remove, but also has the more difficult effect of converting the cream or yellow colored impurities without apparently removing same. The resulting zirconium compound product is as white and of as high opaquing value as the best grade of pure zirconium oxide when compared on the basis of $ZrO_2$ equivalents.

(3). The use of sodium silico fluoride effects these improved results without permanently adding materials of an inert nature with respect to production of capacity.

(4). Any impurities or inert materials added remain in such condition that they may be thereafter removed by volatization during heating with acid or by subsequent water extraction or by low temperature digestion with dilute acids as herein described.

The following example will serve to illustrate how my improved methods may be practiced: Zirconium cyanonitride, preferably prepared from zircon and refined chemically so as to remove as far as practicable the titanium, iron, phosphorous and other compounds present, is heated to oxidation of its zirconium and elimination of its nitrogen and the greater part or all of free carbon formed in the initial stages of oxidation. The resulting product is then wet milled or otherwise reduced to such fineness as to pass readily through 325 mesh. After such milling is completed I add to such finely divided zirconia a small amount of sodium silico fluoride, preferably 8.80 parts to each 100 parts by weight of the crude zirconia with considerable water since this fluoride has a large capacity for taking water. This proportion of sodium silico fluoride may be varied as I have hereinbefore described, depending on the relative purity of the zirconia; I have found it desirable to keep the amount of reactive sodium silico fluoride down to a minimum. To avoid undesired or excessive pressures in the wet milling due to liberated gases, it is advisable to introduce the addition of the sodium silico fluoride and water in small quantities from time to time. The sodium silico fluoride in water acts as a suspending or floating medium for the zirconia which would otherwise settle out into a dense mud. The temperature of the mixture should be kept sufficiently high to prevent the recrystallizing of the sodium silico fluoride which would then partially lose its power of keeping the zirconia in suspension and also tend to separate and be less intimately mixed with the zirconia.

After the charge has been thoroughly mixed it is dried and placed in a muffle or equivalent and then heated to a temperature about 1000° C., preferably from 1050 to 1100° C., and maintained at this temperature with occasional mixing of the charge for about three hours, and is then discharged and cooled. The cooled product consists in masses ranging in size from fine powder to lumps averaging from two to three inches in size depending somewhat on the methods used in drying.

Such cooled product is now charged into a ball mill, or equivalent, and water is added and milled, with proper additions of water to keep the charge of suitable consistency. The masses are broken down with the formation of a smooth viscous liquid substantially of the consistency of cream. The milling is continued for about 60 hours or until a suitably fine condition has been attained. I have found that extreme fineness is important with respect to color improvement and opacity. Such milled product is thinned somewhat with water and then dried, care being taken to keep the final product clean; after such drying the product is broken up into powder suitable for packing.

If desired part (at least one-half) of the sodium and fluorine may be extracted from the final product by leaching with water; also the product may be digested with dilute sulphuric or hydrochloric acid which would remove nearly all the sodium and fluorine present if followed by washing with water. In such digestion with dilute acids any small amount of zirconium combined with sodium would be dissolved and lost; such loss, however, would not be serious as less than 3% of the total zirconium content would pass into solution. This treatment would be preferable in some respects to that heretofore mentioned viz: heating the milled product with a small amount of $H_2SO_4$ followed by extraction with water, since low temperature digestion is cheaper than heating to 900° C.

The final zirconium compound product resulting from treating crude zirconia with 8.80 parts by weight of sodium silico fluoride to 100 parts by weight of zirconia without attempting to remove the residual sodium and fluorine, yielded by analysis the following:

| | Per cent. |
|---|---|
| Zirconium oxide and rare earths ($ZrO_2$) | 81.90 |
| Silica ($SiO_2$) | 11.75 |
| Titanium oxide ($TiO_2$) | 0.70 |
| Iron oxide ($Fe_2O_3$) | 0.15 |
| Sodium (Na) | 1.96 |
| Fluorine (F) | 1.61 |
| Alumina ($Al_2O_3$) | 2.35 |

The composition when the sodium and fluorine were removed gave by analysis the following:

| | Per cent. |
|---|---|
| Zirconium oxide and rare earths ($ZrO_2$) | 85.38 |
| Silica ($SiO_2$) | 11.55 |
| Titanium oxide ($TiO_2$) | 0.72 |
| Iron oxide ($Fe_2O_3$) | 0.15 |
| Alumina ($Al_2O_3$) | 2.44 |

The specific gravity in either case was about 5.00 with the hiding power approximately that of best grade tin oxide when compared in vitreous enamels. With respect to producing opacity in enamel for sheet steel, about 7% (by weight) of this zirconium compound would be sufficient in the semi-opaque frits, while about 12% (by weight) would be required in a clear frit. Its color is pure white or slightly tinged with a light cream color.

Other fluorides besides sodium silico fluoride may be used as a reactive agent, for example, potassium fluosilicate ($K_2SiF_6$), potassium fluoride (KF), sodium fluoride (NaF), and sodium aluminum fluoride ($Na_3AlF_6$); also certain double fluorides may be employed, such as sodium zirconium fluoride and sodium titanium fluoride. The phrase "alkali fluoride compounds" as used herein is applied as a general term to include that group of single or double halogen compounds (particularly fluorides) and also fluoride compounds of alkaline earth metals, which upon heating with crude zirconia will not be volatilized at so low a temperature as to be ineffective in producing the reactions required to decompose or destroy the impurities present in the crude zirconia, yet will not be so inert in fluxing or chemical reactions as to render them ineffective. For example, calcium fluoride and magnesium fluorides due to their high melting points would not prove effective, while silicon tetrafluoride is so volatile at low temperatures that it has no effect in carrying out my methods.

I claim as my invention:

1. The method of treating material composed preponderatingly of zirconium oxide but containing impurities which comprises mixing said material with an alkali fluoride compound, and heating the resulting charge without decomposing the zirconium oxide but to decomposition of said impurities.

2. The method of treating material composed preponderatingly of zirconium oxide but containing impurities which comprises mixing said material with a less quantity of an alkali fluoride compound, and heating the resulting charge without fusing the zirconium oxide therein but to decomposition of said impurities.

3. The method of treating material composed preponderatingly of zirconium oxide but containing impurities which comprises mixing said material with an alkali fluoride compound, not to exceed fifteen per centum by weight of said material, and heating the resulting charge to decomposition of said impurities.

4. The method of treating material composed preponderatingly of zirconium oxide but containing impurities which comprises mixing said material with sodium silico fluoride, and heating the resulting charge to decomposition of said impurities.

5. The method of treating material composed preponderatingly of zirconium oxide but containing impurities which comprises mixing said material with a less quantity of sodium silico fluoride, and heating the resulting charge to decomposition of said impurities.

6. The method of treating material composed preponderatingly of zirconium oxide but containing impurities which comprises mixing said material with sodium silico fluoride, not to exceed fifteen per centum by weight of said material, and heating the resulting charge to decomposition of said impurities.

7. The method of treating material composed preponderatingly of zirconium oxide but containing impurities which comprises mixing said material with an alkali fluoride compound, and heating the resulting charge to above 1000° C.

8. The method of treating material composed preponderatingly of zirconium oxide but containing impurities which comprises mixing said material with an alkali fluoride compound, and heating the resulting charge to to above 1000° C. for about three hours.

9. The method of treating material composed preponderatingly of zirconium oxide but containing impurities which comprises mixing said material with sodium silico fluoride, and heating the resulting charge to above 1000° C.

10. The method of treating material composed preponderatingly of zirconium oxide but containing impurities which comprises mixing said material with sodium silico fluoride, and heating the resulting charge to above 100° C. for about three hours.

11. The method of treating material composed preponderatingly of zirconium oxide but containing impurities which comprises mixing said material with an alkali fluoride compound, in the proportion of about 8.80 parts of alkali fluoride compound to 100 parts by weight of said material, and heating the resulting charge to decomposition of said impurities.

12. The method of treating material composed preponderatingly of zirconium oxide but containing impurities which comprises mixing said material with sodium silico fluoride, in the proportion of about 8.80 parts of sodium silico fluoride to 100 parts by weight of said material, and heating the resulting charge to decomposition of said impurities.

13. The method of treating material composed preponderatingly of zirconium oxide but containing impurities which comprises mixing said material with an alkali fluoride compound, in the proportion of about 8.80 parts of alkali fluoride compound to 100 parts by weight of said material, and heating the resulting charge to between 1000° and 1100° C. for about three hours.

14. The method of treating material composed preponderatingly of zirconium oxide but containing impurities which comprises mixing said material with sodium silico fluoride, in the proportion of about 8.80 parts of sodium silico fluoride to 100 parts by weight of said material, and heating the resulting charge to between 1000° and 1100° C. for about three hours.

15. The method of treating material composed preponderatingly of zirconia but also containing undesired impurities which comprises mixing said zirconia when comminuted with an alkali fluoride compound, heating the charge without decomposing the zirconium oxide but to decomposition of said impurities, cooling and comminuting the resulting product, and removing the residual alkali and fluorine therefrom.

16. The method of treating material composed preponderatingly of zirconia but also containing undesired impurities which comprises mixing said zirconia when comminuted with sodium silico fluoride, and heating the charge to decomposition of said impurities, but without sintering or fusing the zirconium oxide therein.

17. The method of treating material composed preponderatingly of zirconia but also containing undesired impurities which comprises mixing said zirconia when comminuted with a relatively small quantity of an alkali fluoride compound, and heating the charge to decomposition of said impurties, without substantially altering the zirconia therein.

18. The method of treating material composed preponderatingly of zirconia but also containing undesired impurities which comprises mixing said zirconia when comminuted with a relatively small quantity of sodium silico fluoride, heating the charge to decomposition of said impurities without substantially altering the zirconia therein.

19. The method of treating material composed preponderatingly of zirconium but also containing undesired impurities which comprises heating said material to oxidation of the zirconium, milling the charge with water, adding sodium silico fluoride to the mass during said wet milling, and heating the subsequently dried finely-divided mass to decomposition of said impurities.

20. The method of treating material composed preponderatingly of zirconium but also containing undesired impurities which comprises heating said material to oxidation of the zirconium, milling the charge with water, adding sodium silico fluoride to the mass during said wet milling in the proportion of about 8.80 parts of sodium silico fluoride to 100 parts by weight of zirconia, and heating the subsequently dried finely-divided mass to between 1000° and 1100° C. for about three hours.

21. A zirconium oxide compound characterized as being a calcined product, of specific gravity of about 5.00, essentially white in color, as consisting by analysis preponderatingly of unfused zirconia and containing also a less quantity of commingled basic and acid-forming ingredients.

22. A zirconium oxide compound characterized as being a calcined product, of specific gravity of about 5.00, essentially white in color, as consisting by analysis preponderatingly of unfused zirconia and containing also some silica and traces of sodium and fluorine.

23. A zirconium oxide compound characterized as being a calcined product, of specific gravity of about 5.00, essentially white in color, as consisting by analysis preponderatingly of unfused zirconia and containing also some silica and traces of sodium and fluorine commingled with oxides of titanium and iron.

24. A zirconium oxide compound characterized as being a calcined product, of specific gravity of about 5.00, essentially white in color, as consisting by analysis preponderatingly of unfused zirconia and containing also some silica and traces of oxides of titanium and iron.

CHARLES J. KINZIE.